June 16, 1936. H. J. STEGEMAN 2,044,719
TAKE-UP DEVICE
Original Filed April 21, 1934

INVENTOR.
Henry J. Stegeman
BY
Gifford, Scull & Burgess
ATTORNEYS.

Patented June 16, 1936

2,044,719

UNITED STATES PATENT OFFICE 2,044,719

TAKE-UP DEVICE

Henry J. Stegeman, Fairfield, Conn., assignor to The Locke Steel Chain Company, Bridgeport, Conn., a corporation of Connecticut Original application April 21, 1934, Serial No. 721,759. Divided and this application November 19, 1934, Serial No. 753,660

10 Claims. (Cl. 74—242.11)

This application is a division of my copending application Ser. No. 721,759. The novel features of the invention disclosed and claimed herein will be best understood from the following description and the annexed drawing, in which I have shown a selected embodiment of the invention and in which:

Figures 1, 2, 3:
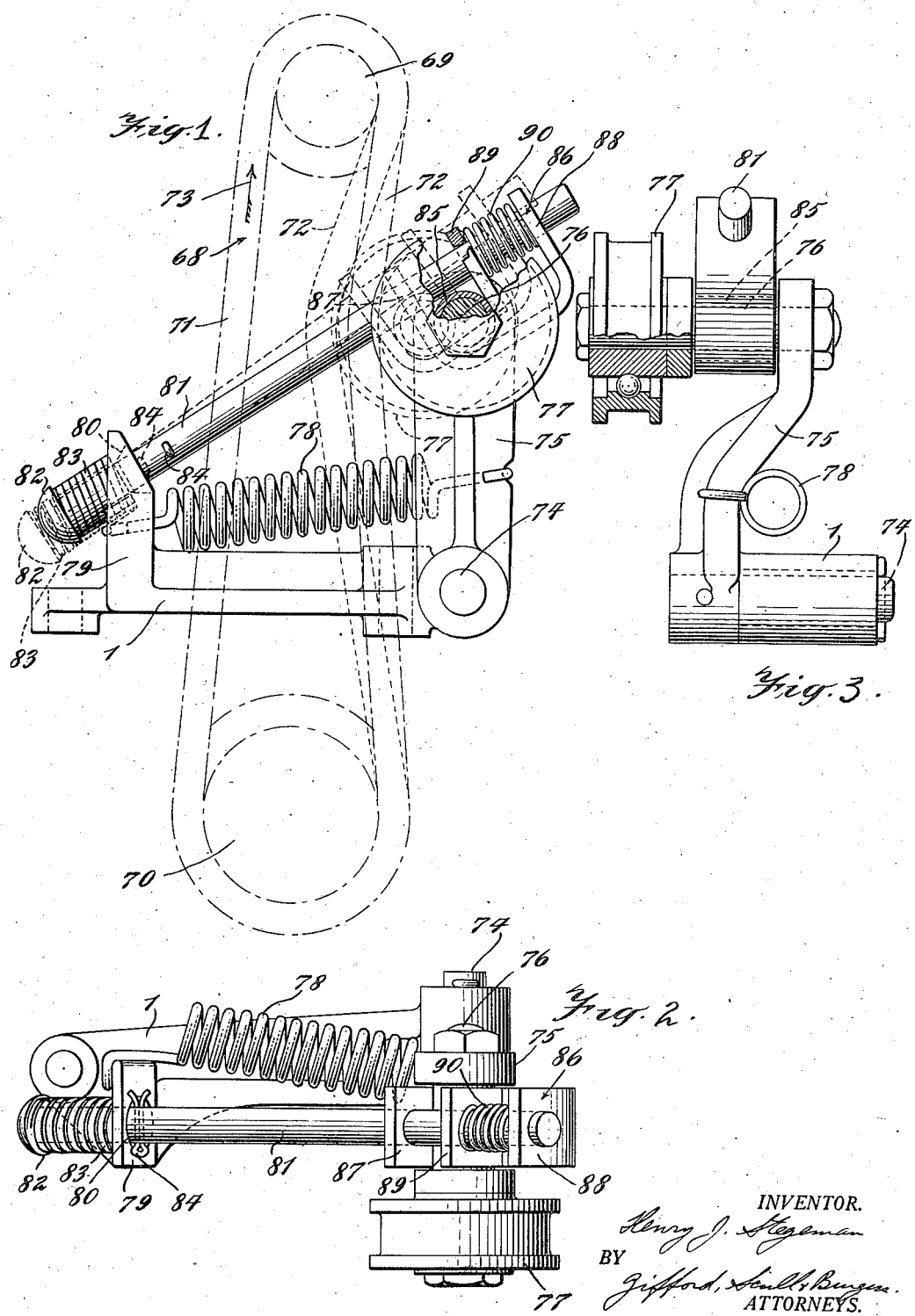
Fig. 1 is an enlarged view of a slack take-up device.
Fig. 2 is a plan view of the structure appearing in Fig. 1.
Fig. 3 is a view, partly in elevation and partly in section, taken from the right of Fig. 1.

The invention is shown as applied to a mowing machine of the general type disclosed in my copending application Ser. No. 634,485, although of course, it may be applied to other machines where found suitable, that is, wherever one shaft is driven from another by means of a flexible driving element, such as a chain or belt.

In this particular embodiment, the chain 68 is shown as connecting a driving sprocket 69 and a driven sprocket 70 and as having a tight side 71 and a slack side 72. The tight side is, of course, the driven side under normal conditions, for example, when the chain is moving in the direction indicated by the arrow 73. The two sprockets 69 and 70 may be journaled in any suitable bearings (not shown) on the frame 1 of the machine.

Pivotally mounted on the frame, as at 74, is an arm 75 having at the upper end thereof a transversely extending stud 76 which forms a pivot for the idler roll 77. The roll is held in yielding engagement with the slack side 72 of the chain by a tension spring 78 engaging the arm 75 and a fixed part 79 of the frame, in this form this part being an upwardly extending projection on the frame. The arrangement just described serves to prevent whipping of the chain to a certain extent and also to make the chain hug the sprockets at all times.

The projection 79 has in the upper portion thereof a hole 80 having a conically shaped wall, and extending through this hole is a rod 81 having a head 82 between which and the projection 79 is a compression spring 83. Extending through the rod 81 on the other side of the projection from the spring 83 is a cotter pin 84 which limits movement of the rod 81, under action of the spring 83, by engagement with the projection or stop 79.

Between the arm 75 and the roll 77 is a spacing sleeve 85, and the rod 81 passes above the sleeve, between the arm and the roll, as plainly shown in the drawing.

Also disposed between the arm 75 and the roll 77 is a U-shaped yoke 86 having in its two legs 87 and 88 aligned holes through which the rod 81 may pass. Disposed above the sleeve 85 is a lock in the form of a locking dog 89 having a hole through which the rod 81 passes, and between this dog and the upper leg 88 of the yoke is a relatively light compression spring 90 tending to urge the dog against the sleeve 85.

The initial position of the roll 77 is shown in full lines in Figs. 1 and 2, and the initial position of the chain 72 is shown in dot and dash lines in Fig. 1. In ordinary operation, the tendency of the spring 78 is to cause the roll 77 to take up the ordinary slack in the side 72 of the chain. As wear may occur, the sleeve 85 bearing against the lower leg 87 of the yoke will move this yoke along the rod 81. Movement of the rod itself is prevented by engagement of the cotter pin 84 with the stop 79, as shown in dotted lines in Fig. 1 and full lines in Fig. 2, and the spring 90, because of its engagement with the leg 88 of the yoke, will follow the movement of that yoke and keep the dog 89 in close engagement with the sleeve 85. This spring will incline the dog so that the rod will pass through the hole in the dog at such an angle as to cause the dog to bind on the rod and resist any tendency of the dog to move upwardly or to the right of Fig. 1 along the rod. The above arrangement would be sufficient if all the bearings were rigidly fixed with respect to each other.

When for any reason, however, an excessive load is applied to the tight side 71 of the chain, the elasticity of the chain, shafts, bearings, and other parts will permit an excess of slack on the side 72 of the chain, which permits the roll 77 and parts associated therewith to move toward the left of Fig. 1 to some such position as that shown in dotted lines in Fig. 1, the yoke and locking dog sliding along the rod 81, which is still held against such movement by engagement of the cotter pin 84 with the stop 79. When such excessive load is removed, then the elasticity of the various parts will tend to cause them to resume their normal positions, including a return of the side 72 of the chain to the position shown in dot and dash lines in Fig. 1.

This return of the side 72 of the chain is resisted by the roller 77 which is locked in position by the locking dog 89 on rod 81. To permit the chain to be restored to its normal position, the rod 81 may slide through the hole in the stop 79, and the spring 83 is weak enough to permit this movement, but the coils of the spring will come in contact with each other and will form a positive stop by the time the side 72 of the chain has reached its normal position, such as indicated, for example, in dot and dash lines in Fig. 1, and until the cotter pin 84 and head 82 have reached some such position as shown in full lines in Fig. 1. As another excessive load is applied, the rod 81 may move to the left until the pin 84 engages the stop 79, and as succeeding excessive loads are applied and released, the rod may move back and forth between the positions shown in full and in dotted lines in Fig. 1. The spring 83 normally will move the rod before the yoke will slide along the rod, and, until the cotter pin 84 strikes the stop 79, all natural wear will be taken up by action of the spring 83.

Preferably, this spring 83, here shown as a flat coil spring, is of such a kind as to exert a substantially uniform action throughout its compression, as nearly as that can be done by any spring, and the length of the spring should be such that the difference between its free length and its compressed length will correspond to the difference between normal position and maximum loaded position of the chain; in other words, between the positions indicated roughly by dot and dash and by dotted lines in Fig. 1.

In case of a reversal so that the side 72 of the chain becomes a driving or tight side, the coils of the spring 83 likewise come together and act as a positive stop to prevent excessive movement of the rod 81 to the right, which would create an excess slack in the chain, particularly on the side 71 which is not provided with a take-up roller. It will also prevent the chain loosening on the sprockets because of any excess slack.

The above arrangement has a material advantage over one in which a single spring, such as the spring 78, is used, because if such a spring were relied upon to perform the same action as that for which the spring 83 is used, there would be a continual flutter of the roller 77, which would be undesirable, and moreover the spring 78 would have to be so strong that it would tend to cause binding of the chain on the sprockets. By the arrangement described above, however, the spring 78 may be used merely to follow up the wear in the chain.

The conical shaped wall 80 permits the rod 81 to pivot in the projection 79 as the roll moves to the right or to the left of Fig. 1.

While I have shown the invention as embodied in a specific form, it is to be understood that various changes in details may be made without departing from the scope of the invention, and I therefore do not intend to limit myself except by the appended claims.

I claim:

1. A slack take-up device for a chain or belt comprising a roller adapted to engage the slack side of a chain, a fixed frame, an arm pivoted on said frame and carrying said roller, a spring holding said roller in engagement with said chain, an auxiliary compression spring acting in the same direction as said first-named spring and also tending to hold said roller in engagement with the slack side of said chain, and a stop limiting expansion of said auxiliary spring.

2. A slack take-up device for a chain or belt comprising a roller adapted to engage the slack side of a chain, a fixed frame, an arm pivoted on said frame and carrying said roller, a spring holding said roller in engagement with said chain, an auxiliary compression spring acting in the same direction as said first-named spring and also tending to hold said roller in engagement with the slack side of said chain, said compression spring having coils adapted to contact with each other to form a positive stop, and a stop limiting expansion of said auxiliary spring.

3. A slack take-up device for a chain or belt comprising a roller adapted to engage the slack side of a chain, a rod extending transversely to the direction of movement of said slack side of the chain, a locking dog slidably mounted on said rod and engaging said roller to prevent movement thereof away from the chain while permitting the roller to follow the chain as it wears, means slidably supporting said rod, means limiting the movement of said rod in the direction of movement of the roller as it takes up slack, and a spring yieldingly resisting movement of the rod in the opposite direction from reaction to excessive loads.

4. A slack take-up device for a chain or belt comprising a roller adapted to engage the slack side of a chain, a rod extending transversely to the direction of movement of said slack side of the chain, a locking dog slidably mounted on said rod and engaging said roller to prevent movement thereof away from the chain while permitting the roller to follow the chain as it wears, means slidably supporting said rod, means limiting the movement of said rod in the direction of movement of the roller as it takes up slack, and a spring yieldingly resisting movement of the rod in the opposite direction from reaction to excessive loads, the difference between the free condition and the loaded condition of said spring corresponding to the difference between the normal position and the excessively loaded position of the chain.

5. A slack take-up device comprising a roller adapted to engage the slack side of a chain, a support for said roller movable towards and away from said chain, a spring urging said support towards the chain to hold said roller in engagement with said slack side thereof, a lock preventing movement of the roller away from the chain, and an auxiliary spring acting upon the roller through said lock to likewise urge the roller towards the chain.

6. A slack take-up device comprising a roller adapted to engage the slack side of a chain, a support for said roller movable towards and away from said chain, a spring urging said support towards the chain to hold said roller in engagement with said slack side thereof, a lock preventing movement of the roller away from the chain, an auxiliary spring acting upon the roller through said lock to likewise urge the roller towards the chain, and means limiting the movement of the roller towards the chain under the influence of said auxiliary spring.

7. A slack take-up device comprising a roller adapted to engage the slack side of a chain, a support for said roller movable towards and away from said chain, a spring urging said support towards the chain to hold said roller in engagement with said slack side thereof, a lock preventing movement of the roller away from the chain, an auxiliary spring acting upon the roller through said lock to likewise urge the roller towards the chain, and means limiting the movement of the roller away from the chain as said auxiliary spring yields.

8. A slack take-up device comprising a roller adapted to engage the slack side of a chain, a support for said roller movable towards and away from said chain, a spring urging said support towards the chain to hold said roller in engagement with said slack side thereof, a lock preventing movement of the roller away from the chain, an auxiliary spring acting upon the roller through said lock to likewise urge the roller towards the chain, means limiting the movement of the roller towards the chain under the influence of said auxiliary spring, and means limiting the movement of the roller away from the chain as said auxiliary spring yields.

9. A slack take-up device comprising a roller adapted to engage the slack side of a chain, a support for said roller movable towards and away from said chain, a spring urging said support towards the chain to hold said roller in engagement with said slack side thereof, and an auxiliary relatively weak compression spring also acting upon said roller to urge it towards the chain, said auxiliary spring acting between relatively fixed and movable parts and the difference between its free and compressed lengths corresponding to the difference between normal and maximum positions of said slack side of the chain.

10. A slack take-up device comprising a roller adapted to engage the slack side of a chain, a suport for said roller movable towards and away from said chain, a spring urging said support towards the chain to hold said roller in engagement with said slack side thereof, an auxiliary relatively weak compression spring also acting upon said roller to urge it towards the chain, said auxiliary spring acting between relatively fixed and movable parts and the difference between its free and compressed lengths corresponding to the difference between normal and maximum positions of said slack side of the chain, and means limiting the movement of the roller towards the chain under the influence of said auxiliary spring.

HENRY J. STEGEMAN.